United States Patent [19]

Allen et al.

[11]  4,230,652

[45]  Oct. 28, 1980

[54] METHOD OF REPAIRING A REFRACTORY STRUCTURE

[75] Inventors: Jim E. Allen; Robert E. Farris, both of Pleasanton, Calif.

[73] Assignee: Kaiser Aluminum & Chemical Corporation, Oakland, Calif.

[21] Appl. No.: 953,722

[22] Filed: Oct. 20, 1978

[51] Int. Cl.³ .............................................. F27D 1/16
[52] U.S. Cl. ........................................ 264/30; 106/56
[58] Field of Search ............................ 106/56; 264/30

[56] References Cited

U.S. PATENT DOCUMENTS

| 2,407,725 | 9/1946 | Schoenlaub | 264/30 |
|---|---|---|---|
| 2,809,126 | 10/1957 | Murphy | 264/30 |
| 3,093,458 | 6/1963 | DeMaison | 264/30 |
| 3,193,402 | 7/1965 | Rusoff | 106/56 X |
| 3,413,385 | 11/1968 | Komac | 264/30 |
| 3,427,369 | 2/1969 | Parsons | 264/30 |
| 3,540,897 | 11/1970 | Martinet | 106/56 |

*Primary Examiner*—Thomas P. Pavelko
*Attorney, Agent, or Firm*—Paul E. Calrow; Malcolm McQuarrie

[57] ABSTRACT

Repair of furnace structures, particularly hot furnace structures, can be achieved by gunning with less dusting and rebound and higher cohesiveness, adherence, and strength in the gunned refractory when the refractory comprises an admixture of aluminosilica aggregate, plastic clay, graphite and, as binder, a liquid sodium silicate solution.

4 Claims, No Drawings

METHOD OF REPAIRING A REFRACTORY STRUCTURE

BACKGROUND OF THE INVENTION

This invention pertains to the repair of refractory structures by gunning. In particular, it pertains to a method wherein aluminosilicate aggregate, plastic clay, graphite, and sodium silicate binder are admixed, placed in a moisture sealed container which is stored for a period of time up to six months, the admixture then being retrieved from the container, placed in a gunning apparatus and projected through the gun nozzle onto a refractory structure, water being added at the nozzle of the gun.

Refractory compositions containing graphite are well-known, for example as disclosed in U.S. Pat. No. 3,010,837, the graphite being added to impede penetration of iron into the refractory, thus reducing the rate of corrosion and erosion of the refractory in contact with molten iron. It is also known to predampen gun mixes, for example as disclosed in U.S. Pat. No. 3,360,594, in order to reduce dusting and rebound when these compositions are gunned. However, such predampening has previously been done on the job site, immediately before application of the refractory. Finally, it is known to ship refractory mixes intended for use as ramming mixes or as plastic materials in a form with the water or other tempering liquid already included, for example as disclosed in U.S. Pat. Nos. 3,832,193 and 3,998,648.

The present invention is directed to the problem of producing a gun mix of reduced dusting and rebound, combined with enhanced adherence, cohesiveness, and strength by use of a liquid binder which is placed in the composition at the point of manufacture.

SUMMARY OF THE INVENTION

It has been found, according to this invention, that a refractory structure, particularly a hot refractory structure, can be repaired by a method comprising
  (a) admixing (i) from 50 to 80% aluminosilicate aggregate, (ii) from 2 to 30% plastic clay, (iii) from 10 to 20% graphite, and (iv) from 5 to 10% liquid sodium silicate the percentages being based on the total weight of the admixture;
  (b) placing the admixture prepared in step (a) in a moisture-sealed container;
  (c) storing the container for a period of time up to 6 months;
  (d) retrieving the admixture from the container;
  (e) placing the admixture in a gunning apparatus having an ejection nozzle adapted to admix water with a granular material passing through the nozzle;
  (f) projecting the admixture through the nozzle while
  (g) adding water to the admixture,
  (h) thereby placing the admixture with added water on a refractory structure
characterized in that the sodium silicate used in the original admixture contains from 45 to 65% water based on the total weight of liquid sodium silicate.

DETAILED DESCRIPTION

The aggregate used in this invention may be any such refractory material, but it has been customary to use aluminosilicate aggregates in graphitic refractories. Thus, aggregates such as alumina, calcined bauxite, calcined bauxitic clay, fireclay (either raw flintclay or calcined clay), kyanite, and refractory grog containing at least 50% $Al_2O_3$ can be used. The aggregate will be sized according to well-known practice to achieve good flow through the gun and good placed density. For example, it will have a maximum size of 6.7 mm (3 mesh) and 80% of it will be larger than 0.59 mm (i.e., will be retained on a 28 mesh screen).

The plastic clay used may be a relatively pure kaolin, a fireclay, ball clay, or material such as bentonite. It will generally be used in finely divided form. In a preferred embodiment of the invention, at least part of the plastic clay is in the form of bentonite. More specifically, the composition will contain up to 4% bentonite.

The graphite used will be relatively pure, i.e., it will be sufficiently high in carbon so that it will show a weight loss upon ignition of at least 85 weight %. It, too, will be used in relatively finely divided form, substantially all less than 0.83 mm in size (i.e., all passing a 20 mesh screen) and about one-third will be smaller than 0.10 mm (will pass a 150 mesh screen). It is desirable that the graphite used be relatively low in ash and particularly in components such as silica which would impair the general refractoriness of the composition.

The sodium silicate used may be any of various such materials of commerce which are readily available and widely used. It will contain from 45 to 65% water, the balance being sodium silicate. The $Na_2O$ to $SiO_2$ ratio may range from 1:1 to 1:3 or even higher. In general, the higher silica sodium silicates are more refractory, but for some purposes the faster solubility of the high soda varieties may be preferred.

The composition is admixed in any suitable equipment, for example a Muller mixer, the dry ingredients being blended first, and the liquid sodium silicate then being added followed by further mixing. After thorough blending of the ingredients, they are then placed in a moisture sealed container, for example a plastic lined bag or a plastic sealed box or bucket. The packaged material may be stored prior to shipment to the user, or it may be shipped and stored by the user until needed.

In any case, the user will remove the composition from its container and place it in any of various conventional gunning apparatus designed to add further water to the mixture as it is passed through the gun nozzle. When a furnace is to be repaired, the admixture will be gunned, further water being added at the nozzle, onto the refractory structure to be repaired.

The method of the present invention results in less dusting of the mix during handling and gunning. Also, during gunning there is less rebound and the gunned material is more cohesive, adhering better to the structure to be repaired and building up to a greater thickness. Also, laboratory specimens indicate that the gunned repair has greater cured strength.

Storage tests of compositions made according to the present invention indicate that they can be stored for from 3 to 6 months in plastic lined paper bags without degradation of properties.

EXAMPLES

The following composition (A), 67.5 parts grog made by crushing fired 70% alumina brick, 10 parts plastic Missouri fireclay smaller than 1 mm (passing a 16 mesh screen), 13 parts Mexaloy No. 30 graphite supplied by The Wickes Corp., Saginaw, Mich., and 2 parts bentonite were blended for 3 minutes in a Hobart mixer. Following this, 7.5 parts "O" brand sodium silicate, a sodium silicate containing 29.5% $SiO_2$, 9.2% $Na_2O$, and 61.3% $H_2O$, was added and mixing continued for a further 3 minutes.

Another composition (B) containing 39 parts South American bauxite smaller than 3.3 mm (passing a 6 mesh screen), 26 parts calcined flintclay smaller than 6.7 mm (passing a 3 mesh screen), 12 parts plastic fireclay, 2 parts bentonite, 13.5 parts graphite and 7.5 parts "O" brand sodium silicate was made in the same way.

The preceding two examples were designed to have an overall $Al_2O_3$ content of about 60%. A composition (C) designed to have 85% $Al_2O_3$ in the overall composition was made in the same way by admixing 64.5 parts South American bauxite smaller than 3.3 mm, 14 parts calcined alumina smaller than 44 microns (passing a 325 mesh screen), 4 parts plastic clay, 10 parts graphite, and 7.5 parts "O" brand sodium silicate.

A further composition (D) having an overall composition of about 45% $Al_2O_3$ was made with 49.5% raw kyanite finer than 147 microns (passing a 100 mesh screen), 27% pulverized plastic clay, 13.5% No. 30 Mexaloy graphite, and 7.5% "O" Brand sodium silicate. A comparison composition (E) was made in exactly the same way but using 10% powdered SSC sodium silicate.

In order to obtain physical properties of Compositions D and E, specimens were pressed at 350 kg/cm$^2$ (5000 psi) in the shape of bars 2.5×2.5×15 cm (1×1×6 inches). Composition D had a bulk density of 2.1 g/cc (135 pcf), compared to a density of 2.3 g/cc (142 pcf) for composition E after drying at 105° C.; after heating to a temperature of 1500° C. they had a density of 2.0 g/cc (122 pcf, respectively). After heating to 1500° C., composition D showed 1.5% shrinkage, an apparent specific gravity of 2.54, an apparent porosity of 23%, and a modulus of rupture (MOR) of 127 kg/cm$^2$ (1800 psi), whereas composition E showed an expansion of 0.5%, an apparent specific gravity of 2.43, an apparent porosity of 19%, and an MOR of 56 kg/cm$^2$ (800 psi).

In the specification and claims, percentages and parts are by weight unless otherwise indicated, except that porosities are expressed in volume percent. Mesh sizes referred to herein are Tyler standard screen sizes which are defined in Chemical Engineers' Handbook, John H. Perry, Editor-in-Chief, Third Edition, 1950, published by McGraw Hill Book Company, at page 963.

We claim:

1. The method of repairing a refractory structure comprising:
    (a) admixing (i) from 50 to 80% aluminosilicate aggregate, (ii) from 2 to 30% plastic clay, (iii) and from 10 to 20% graphite, the percentages being based on the total weight of the admixture;
    (b) predampening said admixture with from 5 to 10% by weight of liquid sodium silicate containing from 45% to 65% of water;
    (c) placing the predampened admixture in a gunning apparatus having an ejection nozzle adapted to admix water with a granular material passing through the nozzle;
    (d) projecting the predampened admixture through the nozzle, while adding water thereto, onto the refractory structure; characterized in that the predampened admixture is substantially dust-free during subsequent handling and exhibits a potential shelf-life of up to six months when stored in a moisture sealed container.

2. Method according to claim 1, wherein there is included, as part of the plastic clay, up to 4% bentonite.

3. Method according to claim 1, wherein the aluminosilicate aggregate is one or more materials chosen from the group alumina, calcined bauxite, calcined kaolinitic bauxite, calcined fireclay, kyanite, and refractory grog containing at least 50% $Al_2O_3$.

4. Method according to claims 1, 2 or 3 wherein the admixture is placed on a hot refractory structure.

* * * * *